(12) United States Patent
Gao et al.

(10) Patent No.: US 12,241,845 B2
(45) Date of Patent: Mar. 4, 2025

(54) METHOD AND SETUP FOR DETECTING SURFACE HAZE OF MATERIALS

(71) Applicant: Beijing Tongmei Xtal Technology Co., Ltd., Beijing (CN)

(72) Inventors: Wei Gao, Fremont, CA (US); Yu Liu, Beijing (CN); Zhizhen Wang, Beijing (CN); Haimiao Li, Beijing (CN)

(73) Assignee: Beijing Tongmei Xtal Technology Co., Ltd., Beijing (CN)

( * ) Notice: Subject to any disclaimer, the term of this patent is extended or adjusted under 35 U.S.C. 154(b) by 340 days.

(21) Appl. No.: 17/789,775

(22) PCT Filed: Dec. 22, 2021

(86) PCT No.: PCT/CN2021/140282
§ 371 (c)(1),
(2) Date: Jun. 28, 2022

(87) PCT Pub. No.: WO2022/267401
PCT Pub. Date: Dec. 29, 2022

(65) Prior Publication Data
US 2023/0341336 A1    Oct. 26, 2023

(30) Foreign Application Priority Data

Jun. 24, 2021   (CN) .......................... 202110706036.1

(51) Int. Cl.
*G01N 21/95*    (2006.01)
(52) U.S. Cl.
CPC ................. *G01N 21/9501* (2013.01)
(58) Field of Classification Search
CPC ........... G01N 21/9501; G01N 21/8806; G01N 21/956; G01N 2021/8845; G01N 2201/06113; G01B 11/30
See application file for complete search history.

(56) References Cited

U.S. PATENT DOCUMENTS

| 7,304,310 B1 | 12/2007 | Shortt et al. |
| 2009/0140180 A1* | 6/2009 | Takahashi .......... G01N 21/9501 |
| | | 250/559.45 |

(Continued)

FOREIGN PATENT DOCUMENTS

| CN | 105870033 A | 8/2016 |
| CN | 107091822 A | 8/2017 |

(Continued)

OTHER PUBLICATIONS

International Search Report mailed Mar. 23, 2022 issued in PCT Application No. PCT/CN2021/140282.

*Primary Examiner* — Roy M Punnoose
(74) *Attorney, Agent, or Firm* — Weaver Austin Villeneuve & Sampson LLP (57) ABSTRACT

The present invention provides a method for detecting surface haze of materials, comprising: optionally, preliminary inspection, which is conducted on materials, to identify the materials with no visible surface defects; and surface haze inspection, to detect the surface haze of the materials; wherein an optical filter module is configured in surface haze inspection setup to filter off the photoluminescence signal of the materials in the light path to the detector, so as to avoid the photoluminescence signal being detected by the detector. The invention further provides a setup for detecting surface haze of materials. By using the invented method and setup for detecting surface haze, it is possible to accurately obtain the surface haze value and/or distribution of the materials.

12 Claims, 4 Drawing Sheets

(56) References Cited

U.S. PATENT DOCUMENTS

| | | |
|---|---|---|
| 2011/0141460 A1 | 6/2011 | Buczkowski et al. |
| 2016/0327485 A1* | 11/2016 | Kiss .................. G01N 21/9505 |
| 2019/0302025 A1 | 10/2019 | Jung et al. |
| 2020/0271511 A1 | 8/2020 | Suzuki et al. |

FOREIGN PATENT DOCUMENTS

| | | |
|---|---|---|
| CN | 210294061 U | 4/2020 |
| CN | 111272773 A | 6/2020 |
| CN | 112229606 A | 1/2021 |
| CN | 112461861 A | 3/2021 |
| CN | 113503840 A | 10/2021 |
| JP | S63156332 A | 6/1988 |
| JP | H10335400 A | 12/1998 |
| RU | 2007137506 A | 4/2009 |
| RU | 2374607 C2 | 11/2009 |
| TW | I724202 B | 4/2021 |

* cited by examiner

METHOD AND SETUP FOR DETECTING SURFACE HAZE OF MATERIALS

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

TECHNICAL FIELD

The present invention relates to the field of material detecting. More specifically, the present invention relates to a method and setup for detecting the surface of materials, and more particularly, to a method and setup for detecting surface haze of materials.

BACKGROUND

As the development of science and technology, the surface smoothness of the materials (such as semiconductor wafers, glass or ceramics) are highly required in some fields. For example, in the fields of electronics and communication, the requirements for the surface quality of semiconductor wafers have become increasingly more demanding. Since the creation of electronic components in the 1950s, semiconductor materials have been widely used in modern production and our daily lives, their importance is self-evident. With the continuing miniaturization and integration of semiconductor devices the surface condition of the substrates has increasingly greater effects on the properties of the devices. In particular, higher surface roughness of substrates will affect the carrier mobility, thereby resulting in less mobility and unduly longer delay. Furthermore, higher surface roughness of substrates will also increase the recombination velocity of carriers on the surface, thus leading to shorter non-equilibrium carrier lifetime and poor performance of devices. Clearly, a good substrate surface condition is critical for peak performance of electronic devices.

"Surface haze" (or "hazes") on the surface of a material refers to a non-directional light-scattering phenomenon caused by surface morphology (i.e., micro-roughness) of materials (e.g., wafers) and imperfection on the surface or in the proximity of the surface in high concentration. In general, "surface haze" is used to characterize the unevenness quality on a scale below the detection limits of the surface particle size. During the fabrication process of certain materials with smooth surface (such as substrates), surface haze would be inevitable. Surface haze is caused by the surface micro-roughness of a material, and will directly affect the performance of the material, e.g., impairing the epitaxial quality of the substrate, which in turn will affect the quality of the resulting epitaxial layer and device. Therefore, during the production, accurately acquiring surface haze distribution and value of a material is of paramount significance for controlling and improving the surface quality of the material.

At present, the techniques of surface-inspection are primarily based on laser scattering; and methods or setups based on such techniques can detect imperceptible surface properties. When testing such properties, the laser is irradiated onto the surface of a material to be inspected at a certain angle, and at the same time the sample to be inspected or the detector rotates at high speed: the detector collects the lights scattered in every direction; and finally the collected light signals are analyzed to obtain surface property information of the material. This method is quite efficient for detecting particles on the material surface or materials with relatively higher roughness, but it is unable to effectively and accurately detect the micro-roughness such as surface haze, owing to the fact that the detection of surface haze signals in the prior art are often interfered by various factors such as surface absorption, thereby affecting accuracy of the surface haze inspection results. Accurately obtaining the surface haze signal to achieve accurate surface inspection has always been difficult.

As described above, issues may arise when existing surface-inspection methods or setups are used for detecting surface haze. Conventional surface-inspection methods or setups are designed mainly for the detection of higher roughness (for example, particles) on the surface of materials (such as wafers). For micro-roughness, such as surface haze expressed in values on the order of 10-6 (ppm), signals are usually difficult to distinguish from noise signals by conventional instruments. Therefore, even if the surface haze signal has been captured, the detected result may be a "false" surface haze as the noise signal has not been excluded. Such an inspection result is of little reference value for quality control of the wafer surface.

The inventors have found that the inspection of surface haze of the materials, in particular of compound semiconductor wafers, using conventional surface inspection instruments might be of no valid reference significance --- because the prior art methods do not take the surface interference caused by photoluminescence of the semiconductor material under laser irradiation into consideration.

The inventors have also found that with the progression of materials, when performing surface haze inspection on the material surface using existing inspection setups, the photoluminescence of materials may become one of the non-negligible factors affecting accurate detection.

Photoluminescence refers to a phenomenon in which materials are excited to emit light by absorbing energy under the irradiation of an external light source. Photoluminescence in semiconductors works in such a way: the valence band of the materials is filled with electrons --- even in the case of the semiconductor materials without impurities; due to thermal or light excitation, the electrons at the top of the valence band are excited into the conduction band, which thereby results in intrinsic conduction: subsequently, the electrons in the conduction band will spontaneously transit from the conduction band to the valence band after lattice relaxation, while simultaneously emitting photons with certain wavelength. This is the process in which photoluminescence of semiconductor materials takes place. For ceramics or glass (e.g., luminescent glass, such as glass doped with luminescent materials), after the absorption of photons, there also exists a similar photoluminescence process.

As well-known in the art, the photoluminescence wavelength of a material is determined by the bandgap size of the material itself, and their specific relation is written in the following formula (I):

$$\lambda_{em} = 1240/Eg \quad (I)$$

in which $\lambda_{em}$ is photoluminescence wavelength, expressed in nm:
Eg is the bandgap size of the material, expressed in eV.

Figure 1:
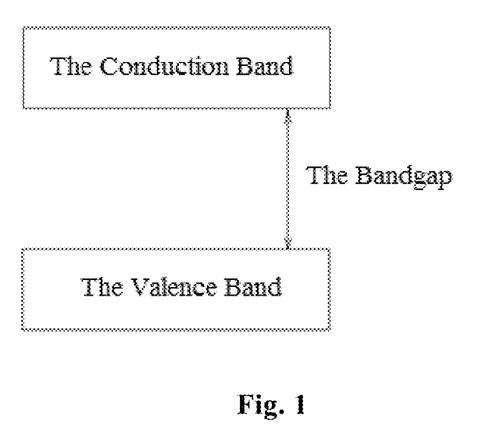
FIG. 1 is a schematic diagram of the energy band of a crystalline material.

In the above formula, the bandgap Eg is dependent on the material, as shown in FIG. 1. In practice, once the material to be measured is determined, the photoluminescence wavelength can be calculated by this formula.

It is found that as the representatives of the elemental semiconductor materials, the indirect bandgap semiconductor materials, such as silicon (Si) (with a bandgap of 1.12 eV) and germanium (Ge) (with a bandgap of 0.67 eV), are unable to generate photoluminescence and thus are not considered.

However, the inventors have found that for compound semiconductor materials, in particular direct bandgap semiconductor materials including group III-V compound semiconductors, such as gallium arsenide (GaAs) (with a bandgap of 1.42 eV) and indium phosphide (InP) (with a bandgap of 1.35 eV), under the general detection conditions, the effects of photoluminescence of such materials on surface haze inspection cannot be ignored. Since the wave vectors of the initial and final states of the direct bandgap semiconductor can be regarded as remaining unchanged during the optical transition process and have high photoluminescence efficiency, and its photoluminescence wavelength precisely falls inside the sensitive range of the conventional Si-detector (or Silicon photodetector), the luminescence effect would remarkably affect the surface haze inspection. Similarly, in the case of ceramics and glass (e.g., luminescent glass, such as glass doped with luminescent materials), the above-mentioned issues may also arise.

Compound semiconductors are widely used in many fields such as analog or digital mobile phones, pagers, base stations, wireless local area networks (Wireless LAN), satellite communication, and microwave communication. The application value of these products continues to increase with the emergence of communication technologies such as 5G. And quality control plays a much more important role in wafers made of such materials.

However, there is an urgent need for an effective method for accurately detecting surface haze of materials (e.g., wafers, in particular compound semiconductor wafers) in the relevant field.

CN111272773A discloses a high-resolution system for detecting surface defects of semiconductor wafers, and defect-inspection method and setup based on shifted illumination related thereto. However, it is aimed at detecting surface particles of semiconductors, not at detecting surface haze.

CN105870033A discloses a method for detecting surface scratches of polished semiconductor wafers, wherein the surface of the semiconductor wafer is irradiated with a pulse laser, and an energy damage threshold is defined to achieve rapid detection of scratches on the wafer surface. This method concerns scratches, the signal of which could be easily captured as their signal intensity is on the same order as that of the particles. However, it is silent on surface haze inspection.

CN112461861A discloses a method for assessing surface quality of polished mono-crystalline silicon wafer, in which the surface haze inspection is characterized by the ratio of light intensities between scattered light and laser emission, which is commonly used in the art. Nevertheless, it is mainly directed to polished mono-crystalline silicon wafers, without considering that the light signal of scattered light detected by the detector might not be completely originated from surface haze (that is, interference signals may be still included in the detected optical signal). Therefore, the method as disclosed in this invention patent still has drawbacks for accurate surface haze inspection, in particular for accurate surface haze inspection of compound semiconductor wafers or direct bandgap semiconductor wafers.

Based on the above analysis, issues may arise when the existing general inspection methods are used for accurately detecting the surface haze distribution and/or values of materials (such as semiconductor substrates, in particular compound semiconductor substrates or direct bandgap semiconductor substrates), and thus accurate results of the surface haze distribution and/or values of the materials cannot be acquired.

The inventor has found that although the criteria for evaluating whether the materials are qualified in terms of their surface haze properties vary according to different uses of materials in the relevant field, due to the interference signals, the detected surface haze distribution and values may be higher than the actual conditions on the material surface, or the actual conditions of surface haze (especially in the case of low surface haze) may be masked by the interference signals and thus are undetectable --- in such cases, the results obtained by surface haze inspection are actually "false". Or even, the tested material may be deemed as unacceptable because of such false results. Thus, such inspection results would be of no reference significance for the quality control of materials. Moreover, such inspection results would have no instructive meaning when backtracking or tracing the origin of said issues.

Thus, it is necessary to make improvements to the methods and setups for detecting material surface haze (including its distribution and/or values) to obtain accurate surface haze distribution and/or values.

SUMMARY OF THE INVENTION

The present invention is aimed at overcoming one or more of the above drawbacks of the prior art, and provides an improved method and setup for detecting surface haze of materials.

One aspect of the present invention provides a method for detecting surface haze of materials, comprising:
  optionally, preliminary inspection, which is conducted on materials, to identify the materials with no visible surface defects; and
  surface haze inspection, to detect the surface haze of the materials:
Wherein an optical filter module is configured in surface haze inspection setup to filter off the photoluminescence signal of the materials in the light path to the detector, so as to avoid the photoluminescence signal being detected by the detector.

In some embodiments, the surface haze inspection comprises irradiating the materials with an incident light, which may be a laser of any wavelength, preferably a one-wavelength laser with a wavelength of ≤660 nm, more preferably ≤490 nm.

In some embodiments, the filtering enables the signal inspection to detect light having a wavelength less than the photoluminescence wavelength, preferably light having a wavelength not greater than the photoluminescence wavelength minus (−) 20 nm.

In some embodiments, the filtering enables the light having a wavelength in a range of the incident light wavelength ±20 nm, preferably in a range of the incident light wavelength ±10 nm, and more preferably a wavelength that is equal to the incident light wavelength to be detected in the signal detecting step.

In some embodiments, the material is any material with a smooth surface: preferably, the material is a semiconductor material, glass or ceramic: more preferably, the material is a semiconductor wafer; even more preferably, the semiconductor wafer has a bandgap of 1.12 to 1.53 eV, preferably 1.35 to 1.43 eV.

In some embodiments, the semiconductor wafer is selected from compound semiconductor wafers, preferably direct bandgap semiconductor wafers, more preferably InP wafer or GaAs wafer.

Another aspect of the present invention provides a setup for detecting surface haze of materials, comprising:

A material-loading unit, including a sample holder for holding the material;

A laser-scanning unit, including a laser source for emitting an incident light: preferably, the incident light may be a laser of any wavelength, preferably a one-wavelength laser with a wavelength of $660 nm, more preferably ≤490 nm;

A signal-inspecting unit, including a detector: preferably a detector that responds to light signal with a wavelength of 280 to 1100 nm: preferably a detector that is a visible-light detector, more preferably a Si-detector or an integrated detector; and A data-analyzing unit, including software for analyzing the signal detected by the signal-inspecting unit:

Wherein the setup for detecting surface haze of the materials further comprises an optical filter module, which is selected from a group consisting of filters, filter coating or a combination thereof, preferably from a group consisting of low-pass filters, band-pass filters, low-pass filter coating, band-pass filter coating, or a combination thereof; preferably, the optical filter module comprises band-pass filters, band-pass filter coating or a combination thereof: preferably, the optical filter module may be an seperate module, or one or more filter coating on the surface of the optical detector; the optical filter module is used for filtering off the photoluminescence signal of the material; the optical filter module is arranged prior to the detector in the propagation direction of the light signal to be detected.

In some embodiments, the optical filter module comprises an optical member capable of selectively transmitting light having a wavelength less than the photoluminescence wavelength, preferably not greater than (photoluminescence wavelength-20 nm).

In some embodiments, the optical filter module comprises an optical member capable of selectively transmitting light having a wavelength in the range of the incident light wavelength ±20 nm, preferably a wavelength in the range of the incident light wavelength ±10 nm, more preferably a wavelength that is equal to the incident light wavelength.

In some embodiments, the optical filter module is selected from a group consisting of a filter, a filter coating and a combination thereof, preferably from a group consisting of a low-pass filter, a band-pass filter, low-pass filter coating, band-pass filter coating, and a combination thereof: preferably, the optical filter module is selected from a group consisting of a band-pass filter, a band-pass filter coating and a combination thereof: preferably, the optical filter module may be an seperate module, or filter coatings on the surface of the optical detector, or combinations thereof.

In some embodiments, the optical filter module has a signal light transmittance of >50%, preferably ≥95%, and more preferably ≥99%.

In some embodiments, the setup for detecting surface haze of the materials is used to detect any material with smooth surface: preferably, the material is a semiconductor material, glass or ceramic: more preferably, the material is a semiconductor wafer; more preferably, the semiconductor wafer is a wafer made of a semiconductor material with a bandgap of 1.12-1.53 eV, preferably 1.35 to 1.43 eV, preferably a wafer made of monoatomic semiconductors or compound semiconductors, and preferably a wafer made of a direct bandgap semiconductor material, and more preferably a wafer made of InP or GaAs.

The method and setup of the present invention achieves authentic and accurate surface haze inspection in term of the distribution and/or values by eliminating or reducing the interference caused by photoluminescence of the material on surface haze inspection.

DETAILED DESCRIPTION

The embodiments of the present invention will be described in detail below. The following embodiments are only exemplary and may not be construed as limiting the present invention. The protection scope of the present invention is defined by the claims only. Also during the implementation of the present invention, all the features described in the following embodiments are not necessarily included. In addition, in the context of the present invention, there are multiple combinations of these features, and the general definitions and preferred definitions can be combined with each other. New technical solutions formed by such combinations are also encompassed by the present disclosure.

Figure 2:
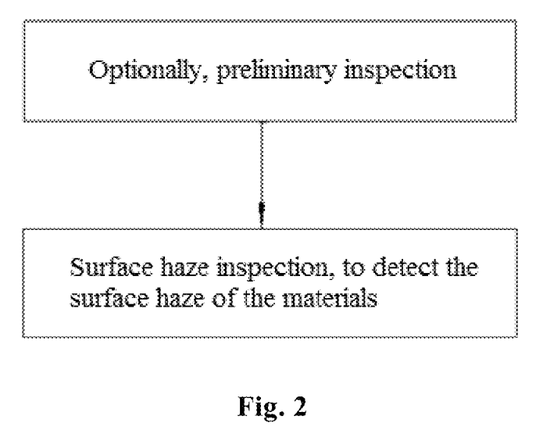
FIG. 2 is a schematic diagram of the method according to the present invention.

As shown in FIG. 2, one aspect of the present invention provides a method for detecting surface haze of materials, comprising:

optionally, preliminary inspection, which is conducted on materials, to identify the materials with no visible surface defects for the following surface haze inspecting: and surface haze inspecting, to detect the surface haze of the materials;

Wherein an optical filter module is configured in the surface haze inspection setup to filter off the photoluminescence signal of the material in the light path to the detector, so as to avoid the photoluminescence signal being detected.

In some embodiments, the surface haze inspecting is performed via a surface haze inspecting setup. The surface haze inspecting setup is equipped with an optical filter module, which can filter off the photoluminescence signal of the material, but does not affect the detecting of the desired signal.

As used herein, the term "surface haze" (or "Haze") refers to a non-directional light-scattering event caused by surface topography (i.e., micro-roughness) and imperfection on the surface or in the proximity of the surface in high concentration. In general, "surface haze" is used to describe the unevenness condition of the surface which is on a scale below the detectable limit of the surface particles. Therefore, only the samples that have passed the surface granularity detecting (in the preliminary inspection) will be subjected to surface haze scanning and detecting. The haze values and distribution reflect the degree of micro-roughness of the material surface.

In some embodiments, the material is semiconductor material, glass, or ceramic. In some embodiments, preferably the material is a semiconductor wafer, in particular a semiconductor wafer that has been cleaned and dried. In some embodiments, the glass is luminescent, and preferably glass added with a luminescent material.

As used herein, the term "wafer" refers to a substrate (with or without an epitaxial layer) formed from semiconductor or non-semiconductor materials. Examples of the wafer include, but are not limited to, monocrystalline silicon, monocrystalline germanium, gallium arsenide, or indium phosphide. In some embodiments, the wafer is a substrate (i.e., bare wafer). In some embodiments, the wafer may also include one or more layers of different materials formed on the substrate.

In some embodiments, the semiconductor wafer is a semiconductor substrate. In other embodiments, the semiconductor wafer may also be an epitaxial wafer.

As used herein, the term "substrate" refers to a clean monocrystalline wafer with a specific lattice plane and appropriate electrical, optical, and mechanical properties, which wafer is used for growing an epitaxial layer thereon.

In some embodiments, the semiconductor wafer has photoluminescence properties.

As used herein, the term "preliminary inspection" refers to the granularity inspection/check of the wafer surface. The preliminary inspection can be performed by various methods or setups generally known in the art. In some embodiments, the preliminary inspection is a light-assisted inspection.

As used herein, the term "light-assisted inspection" refers to checking the wafer surface visually under an high-intensity light.

In some embodiments, the luminance of the light source used in the preliminary inspection falls within the conventional range of luminance used for inspection in the art. Preferably, the luminance is no less than 300,000 lux. More preferably, the luminance is no less than 400,000 lux.

As used herein, the term "luminance" refers to the luminous flux of visible light received per unit area, i.e., the luminous intensity, in lux (lx), a physical quantity that is used to indicate the light intensity and/or the degree to which an object's surface is illuminated.

It is known in the art that for semiconductor wafers, excessive roughness of the wafer surface would affect the detecting of small localized light-scatter (including surface haze). The preliminary inspection is arranged for selecting the semiconductor wafers without major defects (e.g., visible defects) from the finished products (i.e. the wafers that have been subjected to the treatment of polishing, cleaning, drying, or the like) for further surface haze detecting, thereby further improving the wafer quality. In the present application, the preliminary inspection is performed to select or identify the materials without visible surface defects, which materials are further detected for surface haze. In other words, a wafer with visible surface defects is regarded as unqualified directly, and no further surface haze detecting would be performed.

As used herein, the term "visible defect" refers to the defects on the surface of the wafer that are visible under an high-intensity light, such as scratches, chemical residues, orange peel-like defects, bright spots, particles, twin lamellae, edge breakage, cracks, shallow pits, knife marks, streaks, corrosion pits, stains, poorly polished areas, and micro-protrusion. Accordingly, a material (i.e. semiconductor wafer) having no visible surface defects means that none of the above-mentioned defects can be found on its surface.

As used herein, the term "cleaning" refers to removing unnecessary residues from the surface of materials (e.g., wafers).

In some embodiments, the preliminary inspection is optional. In some embodiments, no preliminary inspection is performed. In some embodiments, for some materials, such as ceramics or glass, preliminary inspection step may be omitted.

In some embodiments, according to the method of the present invention, when the material to be inspected is a semiconductor wafer, additional steps such as cleaning or drying the wafer are also included prior to the preliminary inspection. These steps can be carried out by using conventional methods and apparatus in the art.

In some embodiments, the setup used for surface haze inspection may be a surface detecting setup commonly used in the art. Preferably, the surface haze inspection can be performed using wafer surface detecting systems commonly used in the art, such as, but not limited to, KLA Surfscan, KLA Candela series or Unity Lightspeed inspection systems.

In some embodiments, the surface haze inspection includes irradiating the wafer to be detected with an incident light, which may be laser with a wavelength that is commonly used in the art for wafer surface detecting. In some embodiments, the incident light is short-wavelength laser. In some embodiments, the incident light may be one-wavelength laser with any wavelength, which falls within the red or blue-violet bands of the spectrum. In some embodiments, the incident light is laser with a wavelength of ≤660 nm, preferably ≤ 490 nm. In some embodiments, the incident light has a wavelength <490 nm. It has been found that using blue-violet laser, preferably with a wavelength $490 nm, as the incident light, it is possible to improve the detectability of the surface inspection. More preferably, the incident light is laser with a wavelength of 405 nm, 473 nm or 488 nm: particularly preferably, the incident light is laser with a wavelength of 473 nm. In some embodiments, laser with a wavelength of 655 nm may also be used as an incident light.

In some embodiments, the surface haze inspection includes signal detecting. Preferably, the signal detecting is to detect the optical signal of any wavelength, which may be no greater than 1100 nm, preferably 280 to 1100 nm, more preferably 280 to 980 nm, particularly preferably 350 to 850 nm. Preferably, the signal detecting is to detect the optical signal having a wavelength equal to that of the incident light.

As used herein, the term "photoluminescence" refers to a phenomenon in which materials are excited to give light emissions by absorbing energy when exposed to an external light source. Taking semiconductor materials as an example, photoluminescence is a process in which electrons are excited by light to transition from the valence band to the conduction band, and then return to the valence band through lattice relaxation, and at the same time emit photons.

As used herein, the term "photoluminescence signal" refers to an optical signal generated by the photoluminescence of a material.

In the case of the material to be detected having an energy band structure, the photoluminescent wavelength of the material can be determined by using the above formula (I), in order to choose a suitable optical filter module. For crystalline materials such as ceramics and semiconductor materials, Eg is the bandgap width of the material itself; and for amorphous materials, such as glass, especially glass with luminescent materials, Eg is the bandgap width of the luminescent materials.

As used herein, the term "bandgap width" refers to the energy difference between the lowest energy level of the conduction band of a material and the highest energy level of the valence band.

The inventors have found that when inspection of the surface condition is performed, the photoluminescence of the tested material affects the accurate detection of surface haze. This is especially true when the surface haze signal of the tested material is low. Therefore, to accurately detect surface haze, it is necessary to eliminate and reduce the interference of the photoluminescence signal of the material by filtering it out.

As used herein, the term "filtering" refers to substantially removing undesired optical signals (such as optical signals generated by photoluminescence of the tested material), thereby substantially eliminating or reducing its interference or influence on surface haze detecting.

In order to effectively remove non-surface-haze signal (according to the present invention, it usually refers to the photoluminescent signal of the material), in some embodiments, the photoluminescent signal of the wafer is filtered off during the surface haze inspection.

In some embodiments, in the surface haze inspection, the filtering enables that only the light with a wavelength less than the photoluminescence wavelength, preferably not greater than the photoluminescence wavelength minus 20 nm, is detected in the signal inspection step. Preferably, only the light with a wavelength equivalence to that of the incident light is detected in the signal inspection step.

Alternatively, in some embodiments, in the surface haze inspection, the filtering enables that only the light having a wavelength in the range of the incident light wavelength plus or minus (+) 20 nm, preferably in the range of the incident light wavelength plus or minus 10 nm, and more preferably equal to the wavelength of the incident light, is detected in the signal detecting step.

In some embodiments, in the surface haze inspection, the filtering includes selecting an optical filter module. In some embodiments, for instance, in the case of surface haze inspection of semiconductor wafers, the selection of the optical filter module is carried out in such a way: a) calculating the photoluminescent wavelength hem of the semiconductor by using above formula (I); and b) selecting an optical filter module which transmits the light with a wavelength less than $\lambda_{em}$.

Preferably, the optical filter module includes filters and/or filter coatings. In some embodiments, the filtering includes selecting a low-pass filter or filter coating with a cut-off wavelength of no less than the incident light wavelength (ex) and less than the photoluminescence wavelength ($\lambda_{em}$). Preferably, the cut-off wavelength is no less than ($\lambda_{ex}$+20) nm and no more than ($\lambda_{em}$−20) nm. In some embodiments, the filtering includes selecting a band-pass filter or filter coating which transmits the light with a wavelength of ($\lambda_{ex}$±20) nm, preferably, a wavelength of ($\lambda_{ex}$±10) nm, more preferably, a wavelength equal to that of the incident light.

In some embodiments, according to the method of the present invention, the tested material is any material with smooth surfaces. Preferably, the material is selected from semiconductor materials, glass, or ceramics: more preferably, the material is a semiconductor wafer. In some embodiments, the glass is luminescent glass, and preferably glass doped with luminescent materials. Preferably, the semiconductor wafer has a bandgap of 1.12-1.53 eV, and preferably 1.35-1.43 eV. In some embodiments, the material of the semiconductor wafer is selected from elemental semiconductor materials or compound semiconductor materials, and preferably compound semiconductor materials. In some embodiments, the material of the semiconductor wafer is selected from direct bandgap semiconductor materials, and preferably direct bandgap semiconductor materials with a bandgap of 1.12-1.53 eV, or more preferably 1.35-1.43 eV. Preferably, the material of the semiconductor wafer is InP or GaAs.

In some embodiments, according to the method of the present invention, it is particularly preferred that the incident light source has a wavelength of 473 nm, the optical filter module is a band-pass filter or filter coating having cut-off bands of <460 nm and >485 nm, and, accordingly, a transmission band of 460 to 485 nm, with the transmittance at the wavelength of 473 nm being 100%. Such conditions can be used to detect the surface haze of wafers of the compound semiconductors of group III-V, such as wafers of gallium arsenide (GaAs) or indium phosphide (InP).

In some embodiments, said surface haze inspection comprises a material loading step and a data analysis step.

Figure 3:
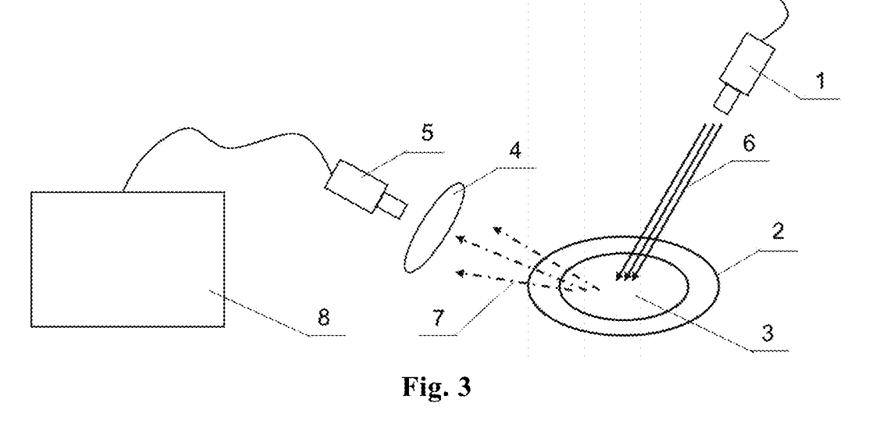
FIG. 3 is a schematic diagram of the setup for detecting surface haze of the materials according to the present invention, in which each number designates one of the following members: 1: laser source, 2: electrostatic chuck, 3: the material to be inspected (placed on the electrostatic chuck 2), 4: optical filter module, 5: detector, 6: incident signal light, 7: signal light to be detected, 8: data-analyzing unit.

Another aspect of the present invention, as shown in FIG. 3, provides a setup for detecting surface haze of materials, which comprises:

A material-loading unit, including a sample holder (e.g., electrostatic chuck 2) for holding the material 3:

A laser-scanning unit, including a laser source 1 for emitting incident light 6:

A signal-detecting unit, including detector 5; and

A data-analyzing unit 8, including testing software for analyzing the signal detected by the signal-inspecting unit:

wherein, the setup for detecting surface haze of the materials further comprises an optical filter module 4 for filtering off the photoluminescence signal of the material 3: the optical filter module 4 is arranged prior to the detector 5 in the propagation direction of the light signal 7 to be detected.

As used herein, the term "sample holder" refers to a setup that holds and immobilizes the sample to be detected during the detecting process. In some embodiments, the sample holders are those commonly used for surface detecting in the art. Preferably, the sample holder is a electrostatic chuck. In the case where the material to be detected is a wafer, the sample holder is a wafer chuck.

In some embodiments, the material-loading unit further includes a material-clamping means (including, but not limited to, a manipulator, and a back- or edge-contacting clamping means) for automatically loading the material to be detected on the sample holder.

In some embodiments, optionally, the setup for detecting surface haze of the materials of the present invention comprises a preliminary inspection unit. In some embodiments, the preliminary inspection unit is a setup commonly used for preliminary inspection of materials (e.g., semiconductor wafers) in the art. In some embodiments, the preliminary inspection unit is a setup useful in light-assisted inspection. In some embodiments, the preliminary inspection setup is a light source, preferably high-intensity light source. Preferably, the high-intensity light source may be, but not limited to, high-luminance halogen light. In some embodiments, the preliminary inspection unit comprises a light source with a luminance of not less than 300,000 lx, preferably not less than 400,000 lx.

In some embodiments, in the laser scanning unit, the laser source for emitting the incident light can emit laser with a determined wavelength. In some embodiments, the laser source preferably emits laser with a wavelength within the red or blue-violet bands of the spectrum, preferably with a wavelength within the blue-violet band of the spectrum. In some embodiments, the laser source emits laser having a wavelength of ≤660 nm, preferably ≤ 490 nm. It has been found that by using a laser source with a wavelength within the blue-violet band of the spectrum, especially with an wavelength of <490 nm, it is possible to improve the detectability of the surface inspection. Preferably, the laser source can emit laser with a wavelength of 405 nm, 473 nm or 488 nm. In some embodiments, the laser source is capable of emitting laser with a wavelength of 655 nm. In some embodiments, preferably, the laser source is capable of emitting laser with a wavelength of 473 nm.

In some embodiments, the signal-detecting unit is a device commonly used in the art, including, but not limited to, receivers and detectors. Preferably, the signal-detecting unit is a detector, more preferably the signal-detecting unit is an integrated detector. In some embodiments, the detectors may be those conventionally used for wafer surface detecting in the art. The detector is used to collect and detect the resulting scattering light signal by illuminating the surface of the semiconductor to be detected with the incident light. More preferably, the detector responds to light signal with a wavelength of 1100 nm or less, preferably 280 to 1100 nm, more preferably 280 to 980 nm, and even more preferably 350 to 850 nm. More preferably, the detector is a visible-light responding detector, and even more preferably a Si-detector.

In the embodiments of the present invention, the data-analyzing unit includes testing software for analyzing the signal detected by the signal-detecting unit, and the testing software is commercially available software known in the art. In some embodiments, the testing software is integrated in the commercially available surface detection devices.

The inventors have found that in order to accurately inspect the surface haze, the photoluminescence signal of the materials (such as semiconductor substrate) to be detected should be removed to an extent that it cannot be detected by the detector, or that it is too weak to affect the detection of the surface haze signal by the detector, such that the optical signal generated by the surface haze can be accurately captured by the detector to give the accurate results of the surface haze distribution and value. The optical filter module of the present invention can be used to effectively filter/eliminate/reduce the undesirable disrupting signals (i.e., non-surface-haze signals, for example, preferably, photoluminescence signals), and thus the surface haze signal can be accurately collected and detected by the detector, while minimizing or eliminating the effects of the photoluminescence signal of the semiconductor material (especially in the case of low surface haze) on the inspection.

Conversely, it could be readily understood that without the optical filter module of the present invention (for example, in the case where a prior art surface inspection equipment is used), the surface haze signals are interfered or even masked by the photoluminescence signal, such that the actual values and/or distribution of surface haze of the material (e.g., semiconductor wafers) would not be accurately (or even could not possibly be) acquired.

According to the present invention, the optical filter module is used for transmitting light with the wavelength falling into the desired range, while "intercepting" the light with the undesired wavelength.

In some embodiments, the optical filter module comprises one or more optical members selectively transmitting light with certain wavelength.

In some embodiments, the optical filter module comprises an optical member selectively transmitting light with a wavelength less than the photoluminescence wavelength ($\lambda_{em}$). Preferably, the optical filter module comprises an optical member selectively transmitting light with a wavelength no greater than ($\lambda_{em}$−20) nm.

In some embodiments, the optical filter module comprises an optical member selectively transmitting light having a wavelength range at ($\lambda_{ex}$±20) nm. Preferably, the optical filter module comprises an optical member selectively transmitting light having a wavelength range at ($\lambda_{ex}$±10) nm. More preferably, the optical filter module comprises an optical member selectively transmitting light with a wavelength that is equal to $\lambda_{ex}$.

According to the present invention, preferably the optical filter module is selected from filters, filter coatings or a combination thereof, preferably low-pass filters, band-pass filters, low-pass filter coatings, band-pass filter coatings or a combination thereof. In some embodiments, preferably the optical filter module comprises low-pass filters, low-pass filter coatings, or a combination thereof. In some embodiments, preferably the optical filter module comprises band-pass filters, band-pass filter coatings, or a combination thereof.

As used herein, the terms "filter" and "filter coating" both refer to the optical filter module used for selectively transmitting light with wavelengths of particular irradiation wavebands.

off interference optical signals with undesirable wavelengths (including but not limited to the photoluminescence signal), thus achieving more accurate surface haze detecting results.

The optical filters/coatings selected for different semiconductor materials may be (but not limited to) those shown in Table 1.

TABLE 1

The transmission wavelength ranges of the band-pass filters/films and the cut-off wavelength ranges of the low-pass filters/coatings that can be selected for different semiconductor materials.

| Incidence light wavelength (nm) | semiconductor material for the substrate to be detected | photo-luminescence wavelength (nm) | Wavelength ranges to be filtered off by optical filter module (nm) | Transmission wavelength ranges of the band-pass filters/ coatings (nm) | Cut-off wavelength λ ranges of the low-pass filters/ coatings (nm) |
|---|---|---|---|---|---|
| ~473 | Si | 1107 | ≥1107 | 473 ± 10 | 473 ≤ λ < 1107 |
| ~473 | InP | 918 | ≥918 | 473 ± 10 | 473 ≤ λ < 918 |
| ~473 | GaAs | 867 | ≥867 | 473 ± 10 | 473 ≤ λ < 867 |

As used herein, the term "low-pass filter/coating" refers to an optical filter module that may transmit light with a wavelength less than a certain value, and cut off light with a wavelength equal to or greater than said value.

As used herein, the term "band-pass filter/film" refers to an optical filter module that may transmit light with a wavelength within a certain range, while intercepting light with wavelengths beyond said range.

In some embodiments, the filters or filter coatings may be those of any type that is known in the art. Preferably, the optical filter is configured prior to the detector in the propagation direction of the optical signal to be detected, in a way conventionally known in the art. In some embodiments, the filter is configured between the material-loading unit and the signal-detecting unit. Preferably, the filter coating is arranged on the detector through a method conventionally known in the art on the detector. Preferably, the filter coating is plated on the surface of the detector.

In some embodiments, the cut-off wavelength of the selected low-pass filter or filter coating is not less than the excitation light wavelength ($\lambda_{ex}$), and is less than the photoluminescence wavelength ($\lambda_{em}$). Preferably, the cut-off wavelength of the selected low-pass filter or filter coating is not less than ($\lambda_{ex}$+20) nm and not greater than ($\lambda_{em}$−20) nm.

In some embodiments, the transmission wavelength of the selected band-pass filter or filter film is ($\lambda_{ex}$±20) nm: preferably, the transmission wavelength is ($\lambda_{ex}$±10) nm.

In some embodiments, the optical filter module of the present invention may comprise a filter or a filter coating. In other embodiments, the optical filter module may comprise two or more filters of the same or different types. In other embodiments, the optical filter module may comprise two or more filter coatings of the same or different types. In other embodiments, the optical filter module of the present invention may comprise a combination of at least one filter and at least one filter coating, wherein the filter and the filter coating may be of the same or different types, and may have different transmission wavelengths.

By using optical filter modules comprising of one or more filters and/or filter coatings, of the same or different types, with various transmission wavelengths, it is possible to filter In some embodiments, the optical filter module has a transmittance of ≥50%, preferably a transmittance of ≥95%, and more preferably a transmittance of ≥99%.

In some embodiments, the optical filter module of the present invention can automatically select suitable filters according to the material of the semiconductor wafer (such as semiconductor substrate) to be detected, in order to automatically and selectively acquire the surface haze distribution and value of the wafers made of different semiconductor materials. In some embodiments, the optical filter module of the present invention may comprise a filter-selecting unit: after being given the information of the semiconductor material type of the wafer to be tested, the computer will automatically select the appropriate optical filter module (for example, filter or filter coating), and then automatically change appropriate optical components to be ready for the detection.

In some embodiments, the setup for inspecting surface haze of the materials according to the present invention is useful in inspecting a wafer of semiconductor material with a bandgap of 1.12 to 1.53 eV, more preferably 1.35 to 1.42 eV. In some embodiments, the inspection setup of the present invention is used to detect the surface haze of wafers made of elemental semiconductor materials or compound semiconductor materials, preferably wafers made of compound semiconductor materials. In some embodiments, the inspection setup of the present invention is used to inspect the surface haze of wafers made of direct bandgap semiconductor materials, preferably wafers made of direct bandgap semiconductor materials with a bandgap of 1.12 to 1.53 eV, more preferably 1.35 to 1.42 eV. In some embodiments, the inspection setup of the present invention is used to inspect wafers of InP or GaAs.

EXAMPLES

Example 1

A 3-Inch N-type InP (sulfur-doped) wafer was subjected to surface haze inspection. After having been cleaned and dried, the wafer was further treated in the following steps:

1. Preliminary Inspection

The cleaned wafer was inspected by the aid of a high-intensity light source (purchased from Yamada Optics, Japan). The luminance was not less than 400,000 lx. During the inspection, the wafer was carefully observed under the high-intensity light source, while being slowly rotated clockwise and then counterclockwise, in order to determine whether there are any visible defects (such as scratches, chemical residues, and orange peel-like defects) on the wafer surface. The wafer without visible defect, i.e., passed the preliminary inspection, would be inspected for surface haze.

2. Surface Haze Inspection

The LIGHTSPEED inspection system under the 4See Series from the UnitySC company (France) was used.

a. The wafer that had passed the preliminary inspection was placed on the wafer holder (i.e. a wafer electrostatic chuck) of the inspection system. Blue laser with a wavelength of 473 nm was used as the incident light.

b. An optical filter module was selected in the following way: the wafer to be inspected was made of InP material, which has a bandgap of 1.35 eV, and thus the photoluminescence wavelength of the material was calculated to be: $\lambda_{em}=1240/1.35=918$ nm. Accordingly, an optical filter module capable of filtering off a light signal with a wavelength of 918 nm --- a low-pass filter with a cut-off wavelength of less than 918 nm may be selected. Specifically, in this example, a low-pass filter with a cut-off wavelength of 550 nm, with a transmission band transmittance of 95% was used.

c. Signal inspection and analysis

A suitable optical filter module was selected and configured prior to the signal-inspecting unit (i.e., Si-detector) in the propagation direction of the light signal to be detected. Subsequently, the wafer was scanned with the laser-scanning unit; the scattered light signal that had passed the optical filter module was inspected by the Si-detector; and the detected signal data was analyzed by the data-analyzing unit (including the built-in testing software). The results of the surface haze inspection were shown in FIG. 4.

In the case where the optical filter module was not used, the same wafer that had passed through the preliminary inspection was subjected to the surface haze inspection under the same conditions. The results were shown in FIG. 5.

Figure 5:
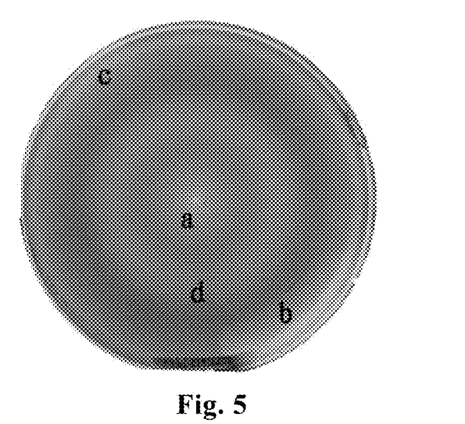
FIG. 5 shows the result of surface haze inspection performed on N-type InP (sulfur-doped) wafer without using an optical filter module, as illustrated in Example 1.

FIG. 5 shows the surface haze of an N-type InP wafer detected without using the optical filter module. As shown in FIG. 5, the surface haze distribution on the wafer surface was observed blurry: high intensities of surface haze were observed in areas a, b, c, and d, with the intensity values of 2.223 ppm, 2.134 ppm, 1.324 ppm, and 1.153 ppm, respectively: accordingly, the median value for the surface haze of the entire wafer was 1.877 ppm. Generally, when the median value of the surface haze intensity of the InP wafer is not greater than 0.15 ppm, the surface haze of the wafer will be considered acceptable. Therefore, based on the above results, the wafer would be deemed to be unacceptable.

Figure 4:
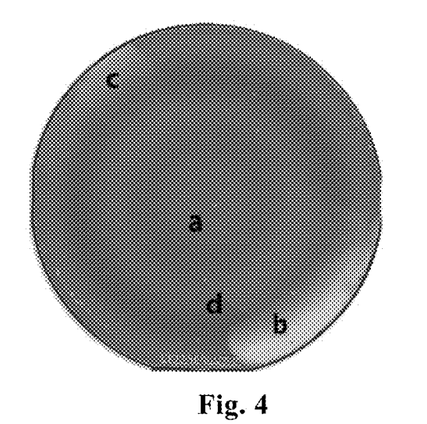
FIG. 4 shows the result of surface haze inspection performed on N-type InP (sulfur-doped) wafer using the inventive optical filter module, as illustrated in Example 1.

FIG. 4 is a diagram showing the surface haze of the same N-type InP wafer detected by using the optical filter module of the present invention. As shown in FIG. 4, high intensities of surface haze were observed in areas a, b, c, and d of the wafer; however, the intensity values were 0.253 ppm, 0.142 ppm, 0.041 ppm, and 0.023 ppm, respectively. Moreover, the surface haze distribution on the wafer surface was very clear, especially in area d, where the boundary line of the surface haze can be clearly observed. The median value of the surface haze of the entire wafer was 0.036 ppm. Thus, the wafer was actually a wafer with acceptable surface haze.

By comparing FIG. 4 with FIG. 5, it can be seen that the surface haze value as detected in each of the areas of the wafer marked as a, b, c, and d as shown in FIG. 5 was actually a false result due to the photoluminescence of the wafer material; and due to the interference caused by the photoluminescence of the wafer, an unclear distribution of the surface haze distribution can be observed. In contrast, after using the optical filter module of the present invention, as shown in FIG. 4, the photoluminescence signal of the wafer had been effectively removed, thereby making it possible to acquire a more accurate surface haze distribution map (FIG. 4) and more accurate surface haze values, which facilitate more reliable quality assessment of the wafer.

Similar results could be obtained when the optical filter module used here optionally is a band-pass filter (or otherwise a filter coating, or a combination thereof) with a center wavelength of 473 nm.

Example 2

A 3-Inch N-type InP (sulfur-doped) wafer was subjected to surface haze inspection. After having been cleaned and dried, the wafer was further treated in the following steps:

1. Preliminary Inspection

The cleaned wafer was inspected by the aid of a high-intensity light source (purchased from Yamada Optics, Japan). The luminance was not less than 400,000 lx. The process and the criteria for the light-assistant inspection were the same as those described in Example 1. The wafer that had passed the preliminary inspection was used for surface haze inspection.

2. Surface Haze Inspection

The LIGHTSPEED inspection system under the 4See Series from the UnitySC company (France) was used.

a. The wafer that had passed the preliminary inspection was placed on the wafer holder (i.e. a wafer electrostatic chuck) of the inspection system. Blue laser with a wavelength of 473 nm was used as the incident light.

b. An optical filter module was selected in the following way: the wafer to be inspected was made of InP material, which has a bandgap of 1.35 eV, and thus the photoluminescence wavelength of the material was calculated to be: $\lambda_{em}=1240/1.35=918$ nm. Accordingly, an optical filter module capable of filtering off an light signal with a wavelength of 918 nm --- a low-pass filter with a cut-off wavelength of less than 918 nm may be selected.

Specifically, in this example, a low-pass filter with a cut-off wavelength of 550 nm, with a transmission band transmittance of 90% was used.

c. Signal inspection and analysis

A suitable optical filter module was selected and configured prior to the signal-inspecting unit (i.e., Si-detector) in the propagation direction of the light signal to be detected. Subsequently, the wafer was scanned with the laser-scanning unit: the scattered light signal that had passed the optical filter module was inspected by the Si-detector; and the detected signal data was analyzed by the data-analyzing unit (including the built-in testing software). The results obtained after surface haze inspection were shown in FIG. 6.

In the case where the optical filter module was not used, the same wafer that had passed through the preliminary inspection was subjected to the surface haze inspection under the same conditions. The results were shown in FIG. 7.

Figure 7:
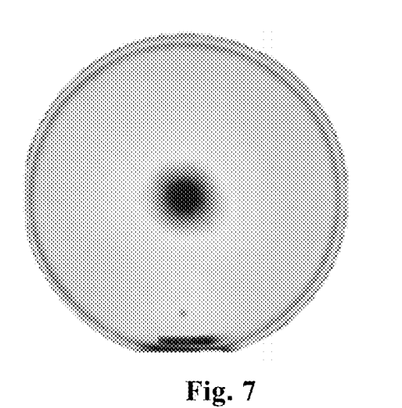
FIG. 7 shows the result of the surface haze inspection performed on the N-type InP (sulfur-doped) wafer without using an optical filter module, as illustrated in Example 2.

FIG. 7 shows the surface haze of an N-type InP wafer detected without using the optical filter module. As shown in FIG. 7, high surface haze value, 3.562 ppm, was observed in the central area of the wafer. Generally, when the median value of the haze intensity on the surface of the InP wafer is not greater than 0.15 ppm, the surface haze of the wafer will be considered acceptable. Therefore, based on the above inspection result, the wafer was regarded as having unacceptable surface haze characteristic.

Figure 6:
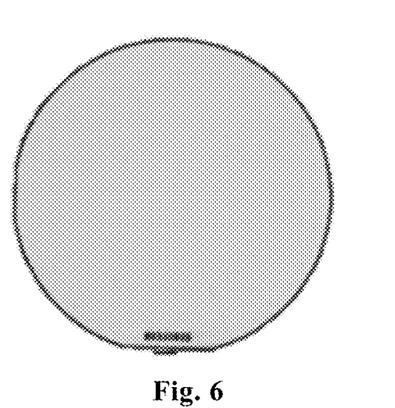
FIG. 6 shows the result of surface haze inspection performed on N-type InP (sulfur-doped) wafer using the inventive optical filter module, as illustrated in Example 2.

FIG. 6 shows the surface haze of the N-type InP wafer detected by using the optical filter module of the present invention. As shown in FIG. 6, the wafer had a uniform surface, without high-intensity surface haze area observed; and the value of surface haze was 0.024 ppm. Thus, the wafer actually had acceptable surface haze characteristic.

By comparing FIG. 6 with FIG. 7, it can be seen that the surface haze distribution with "high" intensity in the central area of the wafer, as shown in FIG. 7 was actually a false result due to the photoluminescence of the wafer material. In contrast, after using the optical filter module of the present invention, the photoluminescence signal of the wafer had been effectively removed, thereby making it possible to acquire a more accurate surface haze distribution map (FIG. 6) and more accurate surface haze values.

Similar results could be obtained when the optical filter module used here optionally is a band-pass filter (or otherwise a filter coating, or a combination thereof) with a center wavelength of 473 nm.

Example 3

A 3-Inch N-type InP (non-doped) wafer was subjected to surface haze inspection. After having been cleaned and dried, the wafer was further treated in the following steps:
1. Preliminary Inspection The cleaned wafer was inspected by the aid of an high-intensity light source (purchased from Yamada Optics, Japan). The luminance was not less than 400,000 lx. The process and the criteria for the light-assistant inspection were the same as those described in Example 1. The wafer that had passed the preliminary inspection was used for surface haze inspection.
2. Surface Haze Inspection The LIGHTSPEED inspection system under the 4See Series from the UnitySC company (France) was used.

a. The wafer that had passed the preliminary inspection was placed on the wafer holder (i.e. a wafer electrostatic chuck) of the inspection system. Blue laser with a wavelength of 473 nm was used as the incident light.

b. An optical filter module was selected in the following way: the wafer to be inspected was made of InP material, which has a bandgap of 1.35 eV, and thus the photoluminescence wavelength of the material was calculated to be: $\lambda_{em}=1240/1.35=918$ nm. Accordingly, an optical filter module capable of filtering off an light signal with a wavelength of 918 nm --- a low-pass filter with a cut-off wavelength of less than 918 nm may be selected. Specifically, in this example, a low-pass filter with a cut-off wavelength of 550 nm, with a transmission band transmittance of 90% was used.

c. Signal inspection and analysis

A suitable optical filter module was selected and configured prior to the signal-inspecting unit (i.e., Si-detector) in the propagation direction of the light signal to be detected. Subsequently, the wafer was scanned with the laser scanning unit: the scattered light signal that had passed the optical filter module was inspected by the Si-detector; and the detected signal data was analyzed by the data-analyzing unit (including the built-in testing software). The results obtained after surface haze inspection were shown in FIG. 8.

In the case where the optical filter module was not used, the same wafer that had passed through the preliminary inspection was subjected to the surface haze inspection under the same conditions. The results were shown in FIG. 9.

Figure 9:
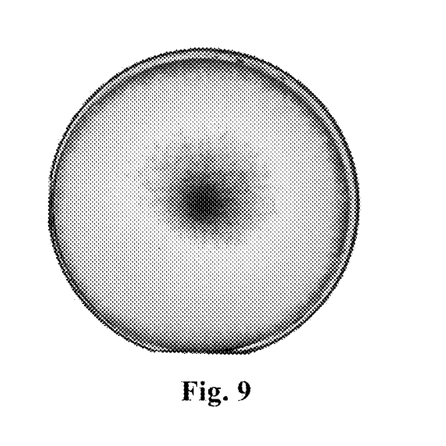
FIG. 9 shows the result of surface haze inspection performed on Un-type InP (non-doped) wafer without using an optical filter module, as illustrated in Example 3.

FIG. 9 shows the surface haze of an N-type InP wafer detected without using the optical filter module. As shown in FIG. 9, high surface haze value, 4.026 ppm, was observed in the central area of the wafer. Generally, when the median value of the haze intensity on the surface of the InP wafer is not greater than 0.15 ppm, the surface haze of the wafer will be considered acceptable. Therefore, based on the above inspection result, the wafer was regarded as having unacceptable surface haze characteristic.

Figure 8:
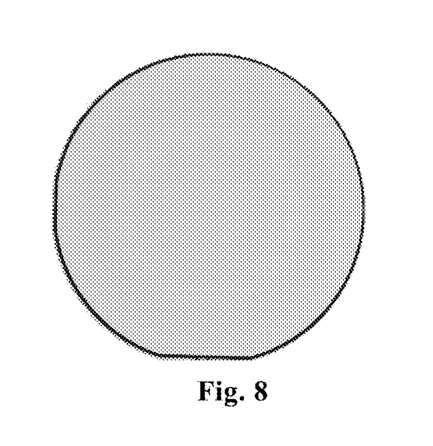
FIG. 8 shows the result of the surface haze inspection performed on the Un-type InP (non-doped) wafer using the inventive optical filter module, as illustrated in Example 3.

FIG. 8 shows the surface haze of the N-type InP wafer detected by using the optical filter module of the present invention. As shown in FIG. 8, the wafer had a uniform surface, without high-intensive surface haze area observed; and the value of surface haze was 0.028 ppm. Thus, the wafer actually had acceptable surface haze characteristic.

By comparing FIG. 8 with FIG. 9, it can be seen that the surface haze distribution with "high" intensity in the central area of the wafer, as shown in FIG. 9 was actually a false result caused by the photoluminescence of the wafer material. In contrast, after using the optical filter module of the present invention, the photoluminescence signal of the wafer had been effectively removed, thereby making it possible to acquire a more accurate surface haze distribution map (FIG. 8) and more accurate surface haze values.

Similar results could be obtained when the optical filter module used here optionally is a band-pass filter (or otherwise a filter coating, or a combination thereof) with a center wavelength of 473 nm.

Example 4

A 4-inch N-type GaAs (silicon-doped) wafer was subjected to surface haze inspection. After having been cleaned and dried, the wafer was further treated in the following steps:
1. Preliminary Inspection The cleaned wafer was inspected by the aid of a high-intensity light source (purchased from Yamada Optics, Japan). The luminance was not less than 400,000 lx. The process and the criteria for the light-assistant inspection were the same as those described in Example 1. The wafer that had passed the preliminary inspection was used for surface haze inspection.
2. Surface Haze Inspection The LIGHTSPEED inspection system under the 4See Series from the UnitySC company (France) was used.

a. The wafer that had passed the preliminary inspection was placed on the wafer holder (i.e. a wafer electrostatic chuck) of the inspection system. Blue laser with a wavelength of 473 nm was used as the incident light.

b. An optical filter module was selected in the following way: the wafer to be inspected was made of GaAs material, which has a bandgap of 1.42 eV, and thus the photoluminescence wavelength of the material was calculated to be: $\lambda_{em}=1240/1.42=873$ nm. Accordingly, an optical filter module capable of filtering off an light signal with a wavelength of 873 nm --- a low-pass filter with a cut-off wavelength of less than 873 nm may be selected. Specifically, in this example, a low-pass filter with a cut-off wavelength of 550 nm, with a transmission band transmittance of 90% was used.

c. Signal inspection and analysis

A suitable optical filter module was selected and configured prior to the signal-inspecting unit (i.e., Si-detector) in the propagation direction of the light signal to be detected. Subsequently, the wafer was scanned with the laser scanning unit: the scattered light signal that had passed the optical filter module was inspected by the Si-detector; and the detected signal data was analyzed by the data-analyzing unit (including the built-in testing software). The results obtained after surface haze inspection were shown in FIG. 10.

In the case where the optical filter module was not used, the same wafer that had passed through the preliminary inspection was subjected to the surface haze inspection under the same conditions. The results were shown in FIG. 11.

Figure 11:
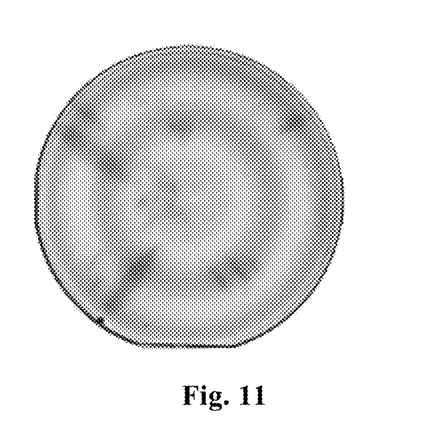
FIG. 11 shows the result of surface haze inspection performed on N-type GaAs (silicon-doped) wafer without using an optical filter module, as illustrated in Example 4.

FIG. 11 shows the surface haze of an N-type GaAs wafer detected without using the optical filter module. As shown in FIG. 11, several areas with high-intensive surface haze were scattered in the shape of a butterfly over the wafer; and the intensity value was 0.852 ppm. As generally recognized in the art, when the GaAs wafer has a surface haze value of less than 0.250 ppm, it is considered as having passed the surface haze inspection. Therefore, based on the above inspection result, the wafer was regarded as having unacceptable surface haze characteristic.

Figure 10:
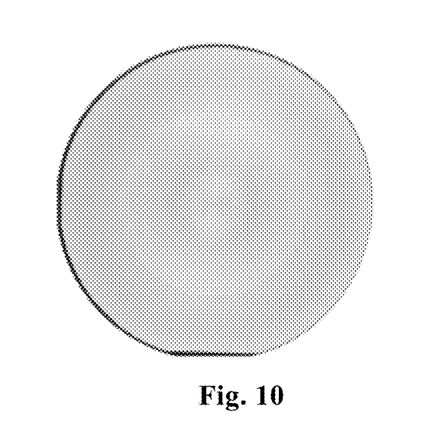
FIG. 10 shows the result of surface haze inspection performed on N-type GaAs (silicon-doped) wafers using the inventive optical filter module, as illustrated in Example 4.

FIG. 10 shows the surface haze of the N-type GaAs wafer detected by using the optical filter module of the present invention. As shown in FIG. 10, the wafer had a uniform surface, without high-intensity surface haze area observed; and the value of surface haze was 0.176 ppm. Thus, the wafer actually had acceptable surface haze characteristic.

By comparing FIG. 10 with FIG. 11, it can be seen that the several areas with high-intensity of surface haze scattered over the wafer, as shown in FIG. 11, were false results caused by the photoluminescence signal of the wafer material. In contrast, after using the optical filter module of the present invention, the photoluminescence signal of the wafer had been effectively removed --- as evident from the comparison between FIG. 10 and FIG. 11, the butterfly-shaped scattered areas of high surface haze would not be observed after the use of the optical filter module, which makes it possible to acquire a more accurate surface haze distribution map and more accurate surface haze values.

Similar results could be obtained when the optical filter module used here optionally is a band-pass filter (or otherwise a filter coating, or a combination thereof) with a center wavelength of 473 nm.

Example 5

A 3-Inch N-type InP (sulfur-doped) wafer was subjected to surface haze inspection. After having been cleaned and dried, the wafer was further treated in the following steps:
1. Preliminary Inspection The cleaned wafer was inspected by the aid of a high-intensity light source (purchased from Yamada Optics, Japan). The luminance was not less than 400,000 lx. The process and the criteria for the light-assistant inspection were the same as those described in Example 1. The wafer that had passed the preliminary inspection was used for surface haze inspection.
2. Surface Haze Inspection The LIGHTSPEED inspection system under the 4See Series from the UnitySC company (France) was used.

a. The wafer that had passed the preliminary inspection was placed on the wafer holder (i.e. a wafer electrostatic chuck) of the inspection system. Blue laser with a wavelength of 473 nm was used as the incident light.

b. An optical filter module was selected in the following way: the wafer to be inspected was made of InP material, which has a bandgap of 1.35 eV, and thus the photoluminescence wavelength of the material was calculated to be: $\lambda_{em}=1240/1.35=918$ nm. Accordingly, an optical filter module capable of filtering off an light signal with a wavelength of 918 nm --- a low-pass filter with a cut-off wavelength of less than 918 nm may be selected. Specifically, in this example, a low-pass filter with a cut-off wavelength of 490-540 nm, with a transmission band transmittance of 90% was used.

c. Signal inspection and analysis

A suitable optical filter module was selected and configured prior to the signal-inspecting unit (i.e., Si-detector) in the propagation direction of the light signal to be detected. Subsequently, the wafer was scanned with the laser scanning unit: the scattered light signal that had passed the optical filter module was inspected by the Si-detector; and the detected signal data was analyzed by the data-analyzing unit (including the built-in testing software). The results obtained after surface haze inspection were shown in FIG. 12.

In the case where the optical filter module was not used, the same wafer that had passed through the preliminary inspection was subjected to the surface haze inspection under the same conditions. The results were shown in FIG. 13.

Figure 13:
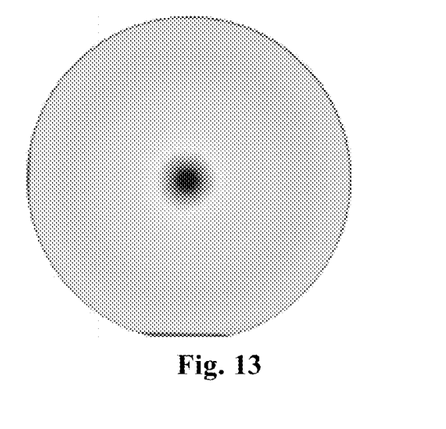
FIG. 13 shows the result of surface haze inspection performed on N-type InP (sulfur-doped) wafer without using an optical filter module, as illustrated in Example 5.

FIG. 13 shows the surface haze of an N-type InP wafer detected without using the optical filter module. As shown in FIG. 13, high surface haze value, 1.791 ppm, was observed in the central area of the wafer. As generally recognized in the art, when the InP-based wafer has a surface haze intensity value of less than 0.150 ppm, it is considered as having passed the surface haze inspection. Therefore, based on the above inspection result, the wafer was regarded as having unacceptable surface haze characteristic.

Figure 12:
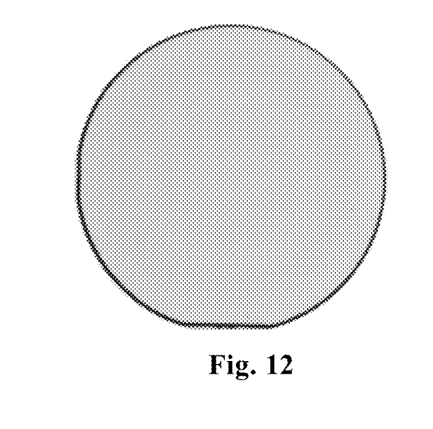
FIG. 12 shows the result of the surface haze inspection performed on the N-type InP (sulfur-doped) wafer using the inventive optical filter module, as illustrated in Example 5.

FIG. 12 shows the surface haze of the N-type InP wafer detected by using the optical filter module of the present invention. As shown in FIG. 6, the wafer had a uniform surface, without high-intensive surface haze area observed; and the value of surface haze was 0.041 ppm. Thus, the wafer actually had acceptable surface haze characteristic.

By comparing FIG. 12 with FIG. 13, it can be seen that the surface haze distribution with "high" intensity in the central area of the wafer, as shown in FIG. 13, was actually a false result due to the photoluminescence of the wafer material. In contrast, after using the optical filter module of the present invention, the photoluminescence signal of the wafer had been effectively removed, thereby making it possible to acquire a more accurate surface haze distribution map (FIG. 12) and more accurate surface haze values.

Similar results could be obtained when the optical filter module used here optionally is a band-pass filter (or otherwise filter coating, or a combination thereof) with a center wavelength of 473 nm.

Example 6

A 3-Inch N-type InP (sulfur-doped) wafer was subjected to surface haze inspection. After having been cleaned and dried, the wafer was further treated in the following steps:
1. Preliminary Inspection The cleaned wafer was inspected by the aid of high-intensity light source (purchased from Yamada Optics, Japan). The luminance was not less than 400,000 lx. The process and the criteria for the light-assistant inspection were the same as those described in Example 1. The wafer that had passed the preliminary inspection was used for surface haze inspection.

2. Surface Haze Inspection

The LIGHTSPEED inspection system under the 4See Series from the UnitySC company (France) was used.

a. The wafer that had passed the preliminary inspection was placed on the wafer holder (i.e. a wafer electrostatic chuck) of the inspection system. Blue laser with a wavelength of 473 nm was used as the incident light.

b. An optical filter module was selected in the following way: the wafer to be inspected was made of InP material, which has a bandgap of 1.35 eV, and thus the photoluminescence wavelength of the material was calculated to be: $\lambda_{em}=1240/1.35=918$ nm. Accordingly, an optical filter module capable of filtering off an light signal with a wavelength of 918 nm --- a low-pass filter with a cut-off wavelength of less than 918 nm may be selected. Specifically, in this example, a low-pass filter with a cut-off wavelength of 830-1200 nm, with a transmission band having a transmittance of 96% was used.

c. Signal inspection and analysis

A suitable optical filter module was selected and configured prior to the signal-inspecting unit (i.e., Si-detector) in the propagation direction of the light signal to be detected. Subsequently, the wafer was scanned with the laser scanning unit: the scattered light signal that had passed the optical filter module was inspected by the Si-detector; and the detected signal data was analyzed by the data-analyzing unit (including the built-in testing software). The results obtained after surface haze inspection were shown in FIG. 14.

In the case where the optical filter module was not used, the same wafer that had passed through the preliminary inspection was subjected to the surface haze inspection under the same conditions. The results were shown in FIG. 15.

Figure 15:
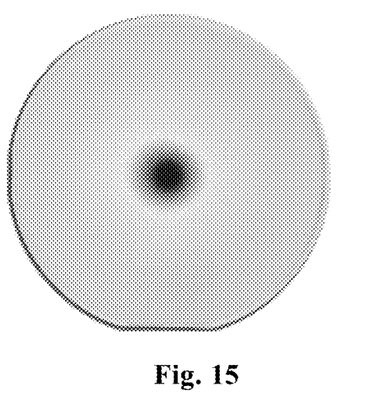
FIG. 15 shows the result of surface haze inspection performed on N-type InP (sulfur-doped) wafer without using an optical filter module, as illustrated in Example 6.

FIG. 15 shows the surface haze of an N-type InP wafer detected without using the optical filter module. As shown in FIG. 15, high surface haze value, 1.919 ppm, was observed in the central area of the wafer. As generally recognized in the art, when the InP-based wafer has a surface haze intensity value of less than 0.150 ppm, it is considered as having passed the surface haze inspection. Therefore, based on the above inspection result, the wafer was regarded as having unacceptable surface haze characteristic.

Figure 14:
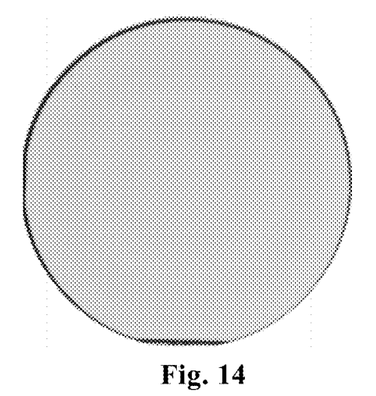
FIG. 14 shows the result of surface haze inspection performed on N-type InP (sulfur-doped) wafers using the inventive optical filter module, as illustrated in Example 6.

FIG. 14 shows the surface haze of the N-type InP wafer detected by using the optical filter module of the present invention. As shown in FIG. 14, the wafer had a uniform surface, without high-intensive surface haze area observed; and the value of surface haze was 0.019 ppm. Thus, the wafer actually had acceptable surface haze characteristic.

By comparing FIG. 14 with FIG. 15, it can be seen that the surface haze distribution with "high" intensity in the central area of the wafer, as shown in FIG. 15, was actually a false result due to the photoluminescence of the wafer material. In contrast, after using the optical filter module of the present invention, the photoluminescence signal of the wafer had been effectively removed, thereby making it possible to acquire a more accurate surface haze distribution map (FIG. 14) and more accurate surface haze values.

Similar results could be obtained when the optical filter module used here optionally is a band-pass filter (or otherwise filter coating, or a combination thereof) with a center wavelength of 473 nm.

Example 7

A 3-Inch N-type InP (sulfur-doped) wafer was subjected to surface haze inspection. After having been cleaned and dried, the wafer was further treated in the following steps:

1. Preliminary Inspection

The cleaned wafer was inspected by the aid of high-intensity light source (purchased from Yamada Optics, Japan). The luminance was not less than 400,000 lx. The process and the criteria for the light-assistant inspection were the same as those described in Example 1. The wafer that had passed the preliminary inspection was used for surface haze inspection.

2. Surface Haze Inspection

The LIGHTSPEED inspection system under the 4See Series from the UnitySC company (France) was used.

a. The wafer that had passed the preliminary inspection was placed on the wafer holder (i.e. a wafer electrostatic chuck) of the inspection system. Blue laser with a wavelength of 473 nm was used as the incident light.

b. An optical filter module was selected in the following way: the wafer to be inspected was made of InP material, which has a bandgap of 1.35 eV, and thus the photoluminescence wavelength of the material was calculated to be: $\lambda_{em}=1240/1.35=918$ nm. Accordingly, an optical filter module capable of filtering off an light signal with a wavelength of 918 nm --- a low-pass filter with a cut-off wavelength of less than 918 nm may be selected. Specifically, in this example, a low-pass filter with a cut-off wavelength of 860-1300 nm, with a transmission band transmittance of 90% was used.

c. Signal inspection and analysis

A suitable optical filter module was selected and configured prior to the signal-inspecting unit (i.e., Si-detector) in the propagation direction of the light signal to be detected. Subsequently, the wafer was scanned with the laser scanning unit: the scattered light signal that had passed the optical filter module was inspected by the Si-detector; and the detected signal data was analyzed by the data-analyzing unit (including the built-in testing software). The results obtained after surface haze inspection were shown in FIG. 16.

In the case where the optical filter module was not used, the same wafer that had passed through the preliminary inspection was subjected to the surface haze inspection under the same conditions. The results were shown in FIG. 17.

Figure 17:
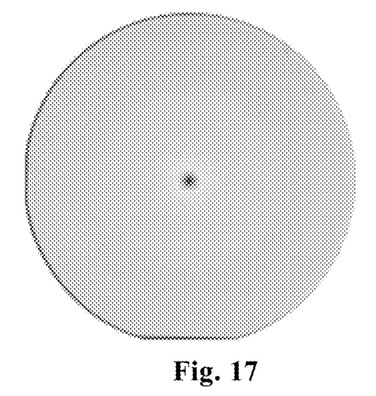
FIG. 17 shows the result of the surface haze inspection performed on the N-type InP (sulfur-doped) wafer without using an optical filter module, as illustrated in Example 7.

FIG. 17 shows the surface haze of an N-type InP wafer detected without using the optical filter module. As shown in FIG. 17, high surface haze value, 1.719 ppm, was observed in the central area of the wafer. As generally recognized in the art, when the InP-based wafer has a surface haze intensity value of less than 0.150 ppm, it is considered as having passed the surface haze inspection. Therefore, based on the above inspection result, the wafer was regarded as having unacceptable surface haze characteristic.

Figure 16:
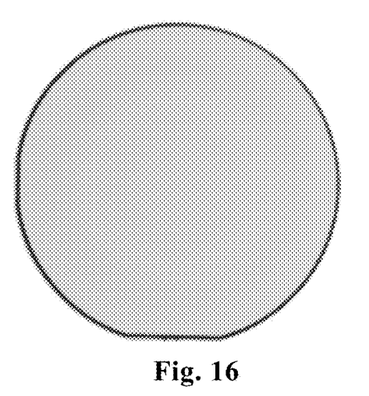
FIG. 16 shows the result of surface haze inspection performed on N-type InP (sulfur-doped) wafer using the inventive optical filter module, as illustrated in Example 7.

FIG. 16 shows the surface haze of the N-type InP wafer detected by using the optical filter module of the present invention. As shown in FIG. 16, the wafer had a uniform surface, without high-intensive surface haze area observed; and the value of surface haze was 0.027 ppm. Thus, the wafer actually had acceptable surface haze characteristic.

By comparing FIG. 16 with FIG. 17, it can be seen that the surface haze distribution with "high" intensity in the central area of the wafer, as shown in FIG. 17, was actually a false result due to the photoluminescence of the wafer material. In contrast, after using the optical filter module of the present invention, the photoluminescence signal of the wafer had been effectively removed, thereby making it possible to acquire a more accurate surface haze distribution map (FIG. 16) and more accurate surface haze values.

Similar results could be obtained when the optical filter module used here optionally is a band-pass filter (or otherwise filter coating, or a combination thereof) with a canter wavelength of 473 nm.

Example 8

A 3-Inch N-type InP (sulfur-doped) wafer was subjected to surface haze inspection. After having been cleaned and dried, the wafer was further treated in the following steps:
1. Preliminary Inspection The cleaned wafer was inspected by the aid of high-intensity light source (purchased from Yamada Optics, Japan). The luminance was not less than 400,000 lx. The process and the criteria for the light-assistant inspection were the same as those described in Example 1. The wafer that had passed the preliminary inspection was used for surface haze inspection.
2. Surface Haze Inspection The LIGHTSPEED inspection system under the 4See Series from the UnitySC company (France) was used.

a. The wafer that had passed the preliminary inspection was placed on the wafer holder (i.e. a wafer electrostatic chuck) of the inspection system. Blue laser with a wavelength of 473 nm was used as the incident light.

b. An optical filter module was selected in the following way: the wafer to be inspected was made of InP material, which has a bandgap of 1.35 eV, and thus the photoluminescence wavelength of the material was calculated to be: $\lambda_{em}$=1240/1.35=918 nm. Accordingly, an optical filter module capable of filtering off an light signal with a wavelength of 918 nm --- a low-pass filter with a cut-off wavelength of less than 918 nm may be selected. Specifically, in this example, a band-pass filter with a cut-off wavelength of <460 nm and >485 nm, with a transmission band transmittance of 460-485 nm (with the transmittance at the wavelength of 473 nm being 100%) was used.

c. Signal inspection and analysis

A suitable optical filter module was selected and configured prior to the signal-inspecting unit (i.e., Si-detector) in the propagation direction of the light signal to be detected. Subsequently, the wafer was scanned with the laser scanning unit: the scattered light signal that had passed the optical filter module was inspected by the Si-detector; and the detected signal data was analyzed by the data-analyzing unit (including the built-in testing software). The results obtained after surface haze inspection were shown in FIG. 18.

In the case where the optical filter module was not used, the same wafer that had passed through the preliminary inspection was subjected to the surface haze inspection under the same conditions. The results were shown in FIG. 19.

Figure 19:
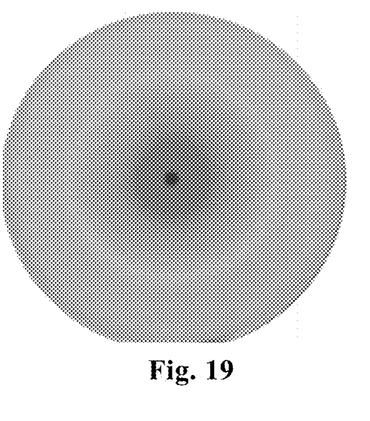
FIG. 19 shows the result of the surface haze inspection performed on the N-type InP (sulfur-doped) wafer without using an optical filter module, as illustrated in Example 8.

FIG. 19 shows the surface haze of an N-type InP wafer detected without using the optical filter module. As shown in FIG. 19, high surface haze value, 2.227 ppm, was observed in the central area of the wafer As generally recognized in the art, when the InP-based wafer has a surface haze intensity value of less than 0.150 ppm, it is considered as having passed the surface haze inspection. Therefore, based on the above inspection result, the wafer was regarded as having unacceptable surface haze characteristic.

Figure 18:
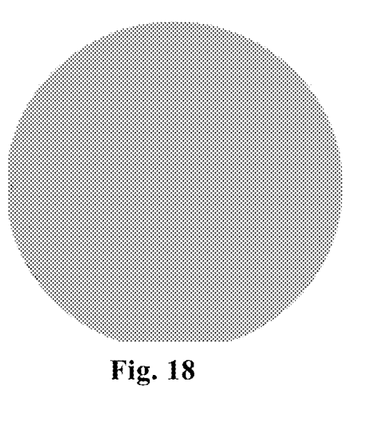
FIG. 18 shows the result of surface haze inspection performed on N-type InP (sulfur-doped) wafers using the inventive optical filter module, as illustrated in Example 8.

FIG. 18 shows the surface haze of the N-type InP wafer detected by using the optical filter module of the present invention. As shown in FIG. 18, the wafer had a uniform surface, without high-intensive surface haze area observed; and the value of surface haze was 0.002 ppm. Thus, the wafer actually had acceptable surface haze characteristic.

By comparing FIG. 18 with FIG. 19, it can be seen that the surface haze distribution with "high" intensity in the central area of the wafer, as shown in FIG. 19, was actually a false result due to the photoluminescence of the wafer material. In contrast, after using the optical filter module of the present invention, the photoluminescence signal of the wafer had been effectively removed, thereby making it possible to acquire a more accurate surface haze distribution map (FIG. 18) and more accurate surface haze values.

Similar results could be obtained when the optical filter module used here optionally is a low-pass filter (or otherwise filter coating, or a combination thereof) with a cut-off wavelength of <918 nm.

What is claimed is:

1. A method for detecting surface haze of materials, comprising the following steps:
   optionally, preliminary inspection, which is conducted on materials, to identify the materials with no visible surface defects; and
   surface haze inspection, to detect the surface haze of the materials;
   wherein an optical filter module is configured in surface haze inspection setup to filter off the photoluminescence signal of the materials in the light path to the detector, so as to avoid the photoluminescence signal being detected by the detector.

2. The method according to claim 1, characterized in that the surface haze inspection comprises irradiating the materials with an incident light, which may be laser of any wavelength, preferably one-wavelength laser with a wavelength of ≤660 nm, more preferably ≤ 490 nm.

3. The method according to claim 1, characterized in that the filtering enables the light having a wavelength less than the photoluminescence wavelength, preferably light having a wavelength not greater than the photoluminescence wavelength minus 20 nm to be detected in the signal detecting.

4. The method according to claim 1, characterized in that the filtering enables the light having a wavelength in a range of the incident light wavelength ±20 nm, preferably a wavelength in a range of the incident light wavelength ±10 nm, and more preferably a wavelength that is equal to the incident light wavelength to be detected in the signal detecting.

5. The method according to claim 1, characterized in that the material is any material with smooth surface; preferably, the material is a semiconductor material, glass or ceramic; more preferably the material is a semiconductor wafer; even more preferably, the semiconductor wafer has a bandgap of 1.12 to 1.53 eV, preferably 1.35 to 1.43 eV.

6. The method according to claim 5, characterized in that the semiconductor wafer is selected from compound semiconductor wafers, preferably direct bandgap semiconductor wafer, more preferably InP wafers or GaAs wafers.

7. A setup for detecting surface haze of materials, comprising:
   A material-loading unit, including a sample holder for holding the material;
   A laser-scanning unit, including a laser source for emitting an incident light; preferably, the incident light may be laser of any wavelength, preferably one-wavelength laser with a wavelength of ≤660 nm, more preferably ≤490 nm;
   A signal-inspecting unit, including a detector; preferably a detector that responds to light signal with a wavelength of 280 to 1100 nm; preferably a detector that is a visible-light detector, more preferably a Si-detector or an integrated detector; and A data-analyzing unit, including software, for analyzing the signal detected by the signal-inspecting unit;

Wherein the setup for detecting surface haze of the materials further comprises an optical filter module for filtering off the photoluminescence signal of the material; the optical filter module is configured prior to the detector in the propagation direction of the light signal to be detected.

8. The setup according to claim 7, characterized in that the optical filter module comprises an optical member capable of selectively transmitting light having a wavelength of less than the photoluminescence wavelength, preferably not greater than the photoluminescence wavelength minus 20 nm.

9. The setup according to claim 7, characterized in that the optical filter module comprises an optical member capable of selectively transmitting light having a wavelength in the range of the incident light wavelength ±20 nm, preferably a wavelength in the range of the incident light wavelength ±10 nm, more preferably a wavelength that is equal to the incident light wavelength.

10. The setup according to claim 7, characterized in that the optical filter module is selected from a group consisting of a filter, a filter coating and a combination thereof, preferably from a group consisting of a low-pass filter, a band-pass filter, low-pass filter coating, band-pass filter coating, and a combination thereof; preferably, the optical filter module comprises a band-pass filter, a band-pass filter coating or a combination thereof; preferably, the optical filter module may be an individual module, or filter coating on the surface of the optical detector, or combinations thereof.

11. The setup according to claim 7, characterized in that the optical filter module has a signal light transmittance of >50%, preferably ≥95%, and more preferably ≥99%.

12. The setup according to claim 7, characterized in that the setup for detecting surface haze of the materials is used to detect any material with smooth surface; preferably, the material is a semiconductor material, glass, or ceramic; more preferably, the material is a semiconductor wafer; more preferably, the semiconductor wafer is a wafer made of a semiconductor material with a bandgap of 1.12 to 1.53 eV, preferably 1.35 to 1.43 eV; preferably a wafer of monoatomic semiconductors or compound semiconductors; preferably a wafer of a direct bandgap semiconductor material, and more preferably a wafer of InP or GaAs.

\* \* \* \* \*